Figure 12:
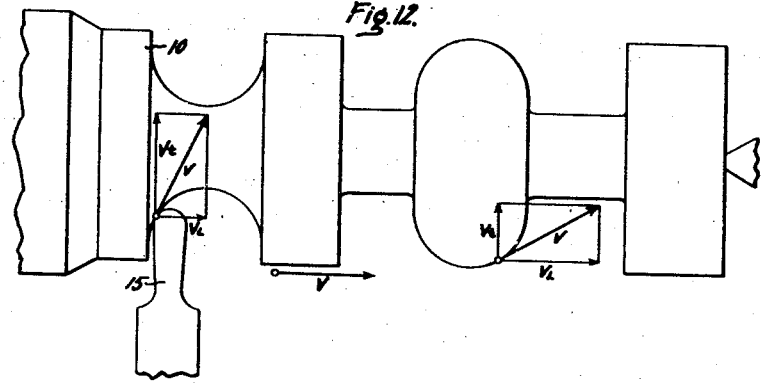

Oct. 29, 1946.    H. P. KUEHNI ET AL    2,410,295
AUTOMATIC PATTERN CONTROLLED MACHINE TOOL
Filed Jan. 19, 1943    3 Sheets-Sheet 1
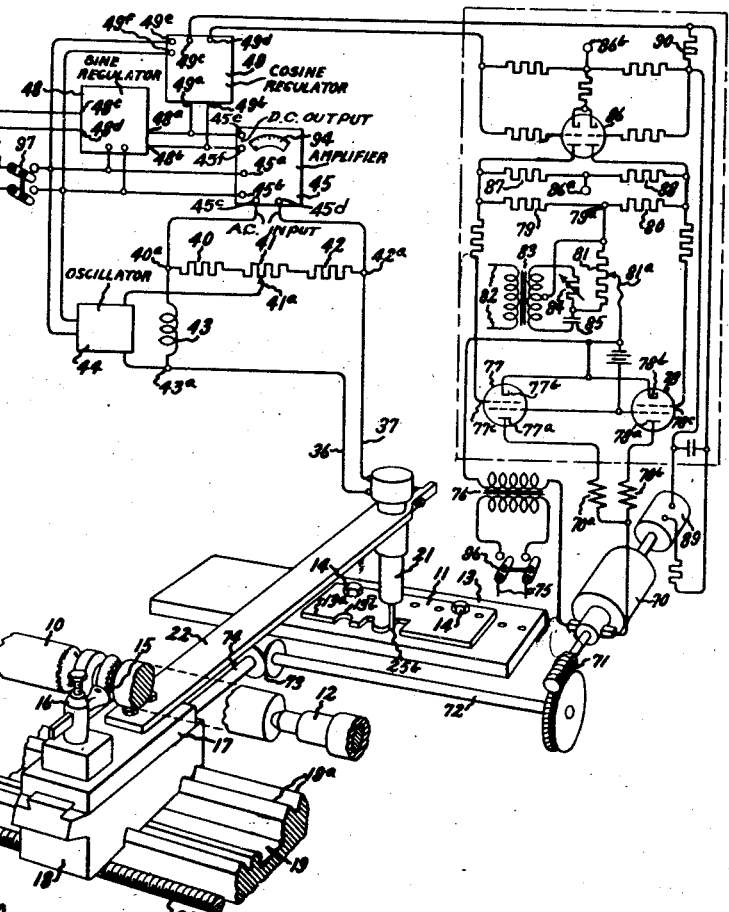
Fig. 1.
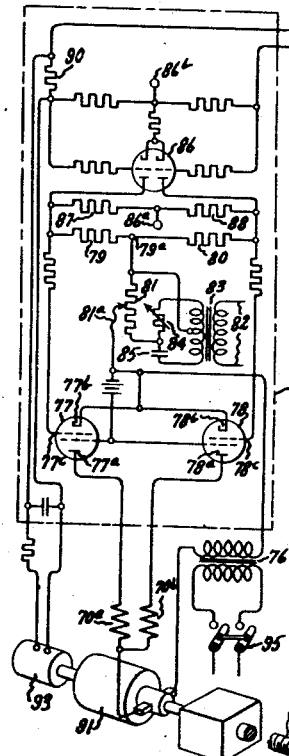
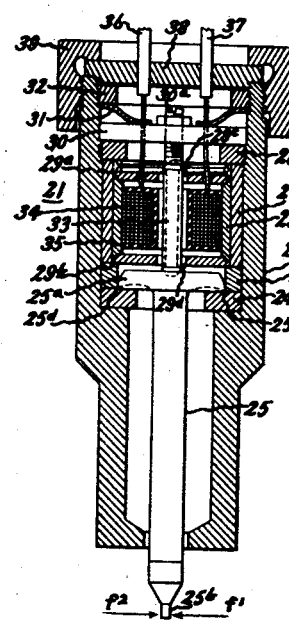
Fig. 2.
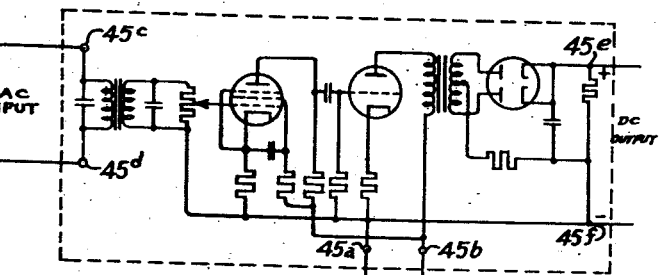
Fig. 16.
Inventors:
Hans P. Kuehni,
Norman G. Branson,
by Harry E. Dunham
Their Attorney.

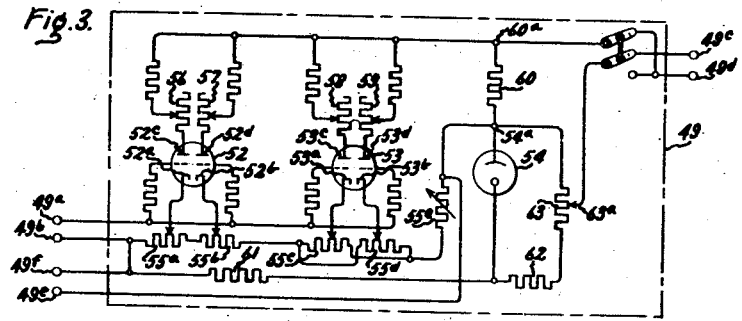
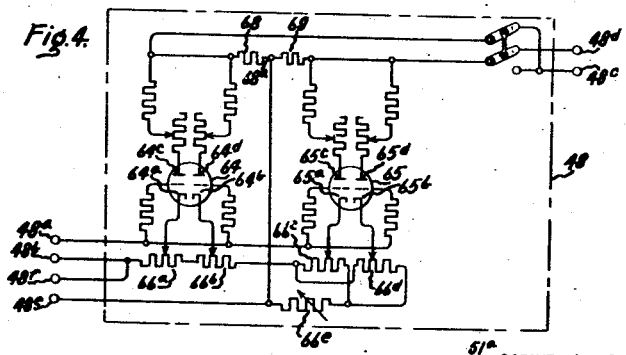
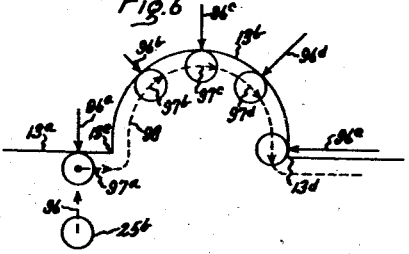
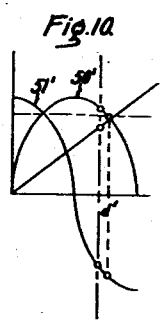
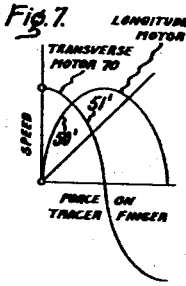
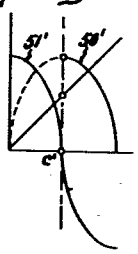
Inventors:
Hans P. Kuehni,
Norman G. Branson,
by Harry E. Dunham
Their Attorney.

Inventors:
Hans P. Kuehni,
Norman G. Branson,
by Harry E. Dunham
Their Attorney.

Patented Oct. 29, 1946

2,410,295

UNITED STATES PATENT OFFICE 2,410,295

AUTOMATIC PATTERN CONTROLLED MACHINE TOOL

Hans P. Kuehni and Norman G. Branson, Schenectady, N. Y., assignors to General Electric Company, a corporation of New York Application January 19, 1943, Serial No. 472,840

8 Claims. (Cl. 172—239)

1

This invention relates to automatic pattern controlled machine tools, more particularly to control systems for such machine tools, and a more specific object of the invention is the provision of a simple, reliable, and improved control system of this character.

More specifically, the invention relates to automatic pattern controlled machine tools such as milling machines, lathes, and the like, and a further object of this invention is the provision of means for effecting a relative movement of the cutter and work piece at a constant contour speed for all angles of such relative movement so that the tool marks on the work will be evenly spaced irrespective of the shape which is being cut.

The relative movement of the cutter and the work piece in machine tools of this character is controlled by means of a tracer device which is maintained in engagement with the pattern as it is moved along the profile thereof.

Another object of the invention is the provision of a control system for a pattern controlled machine tool in which the two components of the relative movement of the cutter and the work piece are continuously correlated so that the movement is not a series of steps and a fine, stepless finish of the work is obtained.

In carrying the invention into effect in one form thereof, means are provided for supporting the pattern and the work piece in operative relationship with the tracer and cutter, respectively. Suitable driving means controlled by the tracer are provided for effecting the relative movement of the cutter and the work piece. This relative movement of the cutter and the work piece is the resultant of two angularly displaced components, e. g., a longitudinal movement and a transverse movement. Means controlled by the tracer control the driving means so that the vector sum of the speeds of these two component movements is approximately constant irrespective of the magnitude of either, and therefore, irrespective of the angle of the resultant movement. This is accomplished by controlling the driving means in response to continuous variation of the force between the pattern and the tracer so that the speed of one of these components is continuously varied from a maximum value in one direction to a maximum value in the reverse direction, dependent upon the magnitude of the force, and the second component is unidirectional and its speed is simultaneously varied in inverse relationship to the speed of the first component.

In a specific embodiment of the invention, the tracer device includes a magnetostrictive member, i. e., a member whose magnetic permeability changes in response to the application of a force to the member. This change in permeability of the magnetostrictive member is utilized to produce a control voltage which in turn is utilized to control the driving means in the manner described in the foregoing.

In illustrating the invention in one form thereof, it is illustrated as embodied in a control system for an automatic pattern controlled metal cutting lathe, and also in a control system for a polar co-ordinate type milling machine.

Figure 13:
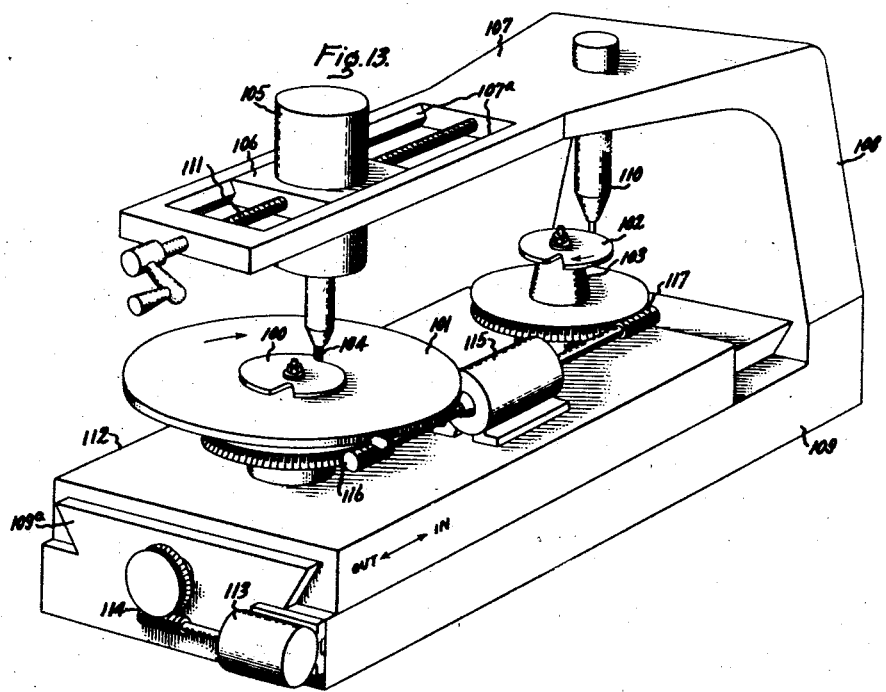
Figure 14:
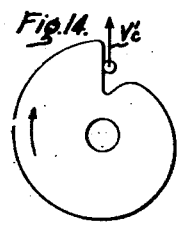
Figure 15:
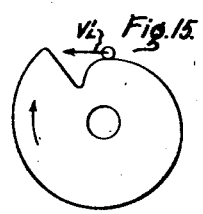

For a better and more complete understanding of the invention, reference may now be had to the following specification and to the accompanying drawings in which Fig. 1 is a simple, diagrammatical illustration of an embodiment of the invention as applied to a lathe; Fig. 2 is a detailed sectional view of the tracer element; Figs. 3 and 4 are simple, diagrammatical illustrations of the sine and cosine regulators which constitute parts of the control system; Fig. 5 is a chart of characteristic curves which serve to explain the operation of the invention; Fig. 6 is a diagrammatical sketch which illustrates graphically the variation of the force between the pattern and the tracer finger at various angles; Figs. 7, 8, 9, 10, and 11 are charts of characteristic curves which illustrate the correlation of the speeds of the motors which produce the components of the relative movement of the cutter and work for the angles indicated in Fig. 6; Fig. 12 is a diagrammatic sketch illustrating the constancy of the velocity of the relative movement between the cutter and work at all angles of such relative movement along the contour; Fig. 13 is a view in perspective illustrating an application of the invention to a polar co-ordinate type milling machine; Figs. 14 and 15 are diagrammatic sketches illustrating the operation of the invention as applied to the milling machine of Fig. 13, and Fig. 16 is a schematic diagram of an amplifier which constitutes an element of the system.

Referring now to the drawings, it is desired to turn a metallic work piece 10 so that the final profile will conform accurately to the profile of the pattern 11. The work piece 10, which may be of steel or other material, is rotated by suitable driving means about a longitudinal axis defined by the lathe centers of which only the tail stock center 12 is illustrated. The driving means for rotating the work may be and preferably is a direct current electric motor supplied from a source of alternating voltage through suitable electric valve apparatus which may be controlled to adjust the speed of rotation of the work piece to a desired value. Since the details of this motor and the electric valve control apparatus from which it is supplied constitute no part of the invention, they are omitted from the drawings in the interest of simplicity.

The pattern 11 is supported by suitable means illustrated as a plate 13 to which the pattern 11 is firmly clamped by suitable means such as clamping screws 14. The supporting plate 13 may be securely fastened to the bed of the lathe, or may be built as an integral part of the lathe.

A cutter 15 is held in a tool post 16 which is mounted in a compound rest comprising an upper cross feed member 17 which is slidably mounted on the cross feed slide of the carriage 18. The carriage 18 is slidably mounted on ways 19a for longitudinal movement along the bedplate 19. The longitudinal movement is effected by means of a lead screw 20 and a cooperating threaded member (not shown) with which the carriage is provided.

A tracer 21 is maintained in fixed but adjustable relationship with respect to the cutter by means of a rigid supporting arm 22 to which the tracer 21 is firmly secured and which, in turn, is rigidly secured to the cutter supporting means, i. e., the compound rest 17. Thus the tracer 21 and the cutter 16 are supported in operative relationship, respectively, with the pattern 13 and work piece 10.

A preferred construction of the tracer device 21 is illustrated in Fig. 2. It comprises an outer cylindrical shell 23 which is formed of mild steel. The upper portion of the shell 23 is bored to have a larger inside diameter than the inside diameter of the lower portion, thereby to provide a seat for a ring 24 which is preferably made of hard tool steel. A tracer finger 25 which is made of hard tool steel and has a shape which is generally similar to that of a poppet valve is mounted within the bore of the lower portion of the shell with its flanged head bearing on the hardened seating ring 24. The lower end of the finger 25 projects through an opening in the bottom of the cylindrical shell and is of tapering shape to provide a cylindrical portion 25b which serves as the contact point which engages the profile edge of the pattern. The clearance between the finger and the outer shell at the bottom may be made quite small, e. g., .01 inch. A second hard steel ring 26 rests upon the lower hard steel ring 24. As indicated, the inside diameter of the ring 26 is greater than the inside diameter of the lower ring 24 so as to provide sufficient space for the flanged head of the tracer finger 25.

A cylindrical spacing member 27 made of hard tool steel is fitted within a large diameter bore in the upper portion of the shell. This cylindrical member is held firmly against the upper hardened ring 26 by means of an annular member 28 which is in threaded engagement with the internal wall of the shell 23.

Within the cylindrical spacing member 27 is a clyindrical jacket 29 which may be made of any suitable magnetic material, e. g., one of the well-known nickel-iron alloys such as Nicalloy or Permalloy. This jacket has a top cap 29a and a bottom cap 29b. These caps are provided with centrally disposed openings 29c and 29d, respectively.

Above the screw ring 28 is a disk member 30 made of hard tool steel. It is firmly seated on the ring 28 by means of a spring washer 31 the tension of which may be suitably adjusted by means of a threaded annular member 32, which is in internal threaded engagement with the wall of the shell 23. The disk 30 is provided with an adjustable set screw 30a.

A hollow cylindrical member 33 made of a material possessing the property of magnetostriction, such as nickel-steel, is arranged centrally within the cylindrical jacket 29 and is of sufficient length to project through the openings 29c and 29d in the top and bottom caps 29a and 29b, respectively. This magnetostrictive element is firmly held between the set screw 30a and the top surface of the horizontal flange of the tracer finger. As shown, the top surface of the flange is provided with a rounded recess to receive the rounded end of the cylindrical magnetostrictive element.

If a force is applied to the contact point 25b of the tracer finger in any radial direction in a plane perpendicular to the longitudinal axis of the finger, a limited rotation of the finger 25 about a point on the seating ring 24 as a pivot will result. For example, if a force $f_1$ acting toward the left is applied to the contact point 25b, the finger will be given a limited rotation in a clockwise direction about the point 25c as a center, and the flanged head 25a acting as a lever will apply a force to compress the magnetostrictive member. Likewise, if a force $f_2$ acting toward the right is applied to the contact point 25b, the finger 25 is given a limited counterclockwise rotation about the point 25d as a center, and the flanged head 25a will apply a force to compress the magnetostrictive member 33. Thus, the tracer finger 25 acts as a bell crank to apply a compressional force to the magnetostrictive member 33 in response to the application of force to the contact point 25b in any radial direction in a horizontal plane. The compression of the magnetostrictive element is therefore independent of the direction of the force applied to the tip of the tracer finger. In other words, the tracer is nondirectional. The application of a force to the magnetostrictive element effects a change in its magnetic permeability.

Within the jacket 29 and surrounding the magnetostrictive member 33 is a coil 34 which is wound upon a spool 35 that is preferably made of a suitable phenolic condensation product, such as Bakelite. The magnetostrictive member and the jacket 29 form a magnetic circuit for the magnet flux produced by the coil. Leads 36 and 37 are brought out from the coil through openings in the top cap 29a, the disk 30, and the disk shaped terminal bracket 38 which is clamped in place at the upper end of the shell by means of an internally threaded clamping ring 39 which is in threaded engagement with the outside wall of the shell 23 at the upper end thereof. The coil 34 constitutes one arm of a Wheatstone bridge, the remaining arms of which comprise the resistor 40 plus the portion of resistor 41 at the left of the slider 41a, the resistor 42 plus the portion of resistor 41 at the right of the slider, and the coil 43.

A periodically varying voltage of suitable frequency, e. g., 2,000 cycles per second is supplied to the opposite bridge points 41a and 43a from an electric valve type oscillator 44. Any suitable type of oscillator may be used. The constructional details of the oscillator are unimportant and the oscillator is therefore indicated conventionally in the drawings.

The Wheatstone bridge is initially balanced by adjustment of slider 41a when no force is applied to the tracer finger and the magnetostrictive element is prestressed. When a force is applied to the tracer finger, this force is multiplied and translated into a compressional force acting on the magnetostrictive member. The resulting change in permeability of the magnetostrictive member unbalances the Wheatstone bridge and causes a periodically varying voltage to appear across the opposite bridge points 40a and 42a. This unbalanced voltage is applied to the input terminals of an electric valve type amplifier 45. Preferably the amplifier 45 is of the type which has a direct voltage output that is approximately linearly proportional to the effective value of the periodically varying input voltage. Direct current power is supplied to the power input terminals 45a and 45b of the amplifier from a suitable source such as a regulated power supply (not shown) which is conventionally indicated in the drawings by the two supply lines 46. The circuit details of this amplifier are illustrated in Fig. 16. As shown the amplifier comprises two stages of voltage amplification with a transformer output to a full wave rectifier. The first stage is a pentode valve and the second stage is a triode valve. The two stages are coupled by means of capacitative coupling. The A-C voltage input is supplied to the terminals 45c, 45d and the D.-C. output voltage appears across the resistor between the terminals 45e and 45f.

The relationship between the force applied to the tracer finger and the output voltage of the amplifier 45 is illustrated graphically by the straight line curve 47 in Fig. 5, in which ordinates represent volts and abscissae represent force acting on the tracer finger. This curve 47 indicates that the direct voltage output is approximately linearly proportional to the force acting on the tracer finger.

The output voltage of amplifier 45 is applied simultaneously to the input terminals 48a, 48b, and 49a, 49b of two electric valve type regulators 48 and 49, respectively, which are referred to as the sine regulator and the cosine regulator, respectively. The sine regulator is an electric valve apparatus which has a direct voltage output which approximates a sine function of the magnitude of the direct voltage applied to its input terminals. That is to say, that as the voltage applied to the input terminals 48a and 48b varies continuously and linearly from a minimum value to a higher value, the voltage at the output terminals 48c and 48d of the sine regulator varies continuously from a minimum value to a maximum value and then to a minimum value, as indicated by the curve 50 of Fig. 5. The cosine regulator 49 is a similar electric valve apparatus, the direct output voltage at the output terminals 49c and 49d of which varies approximately as a cosine function of the magnitude of the direct voltage applied to its input terminals. Since the input voltages of the sine regulator and cosine regulator are the output voltage of the amplifier 45 which is linearly proportional to the force applied to the tracer finger, the output voltage of the sine and cosine regulators are therefore sine and cosine functions of the magnitude of this force.

As indicated in Fig. 3, the cosine regulator comprises a plurality of electric valves 52, 53, and 54. Although the electric valves 52 and 53 may be of any suitable type, they are preferably twin triode valves of the "hard" tube type. The valve 54 is a cold cathode type diode valve containing a small amount of an inert gas such as neon. The important characteristic of this type of valve is that when connected in series with a resistor across a source of variable voltage, the voltage drop across the terminals of the valve remains substantially constant.

Direct current power at a suitable voltage is supplied to the power input terminals 49e and 49f of the cosine regulator from a suitable source such as the regulated power supply represented by the two supply lines 46. A voltage divider comprising fixed resistor portions 55a, 55b, 55c, and 55d and a variable resistor portion 55e is connected across the power input terminals 49e and 49f. The cathodes 52a and 52b of valve 52 and 53a and 53b of valve 53 are connected by means of sliders to points on this voltage divider of progressively increasingly positive voltage so that the left-hand conducting path of valve 52 is biased to cutoff, and the right-hand path of valve 52 and both paths of valve 53 are biased beyond cutoff by progressively increasing amounts. The grids of both valves are all connected together to the input terminal 49a, and the negative terminal of the cathode voltage divider is connected to the input terminal 49b.

The anodes 52c and 52d of valve 52 and 53c and 53d of valve 53 connect through parallel adjustable resistors 56, 57, 58, and 59, respectively, and through a series resistor 60 to the anode of valve 54 which is connected to the positive power input terminal 49e.

The valve 54 is connected in series with a resistor 61 across the power supply, and a voltage divider comprising fixed resistor 62 and adjustable resistor 63 is connected across the valve 54. The power input voltage may be any suitable value which may be assumed, for example, to be 300 volts. Accordingly, the voltage of the terminal 54a is 300 volts positive. The slider 63a is initially adjusted to a point on the voltage divider such that the voltage drop between terminal 54a and the slider is equal to the voltage drop produced across the resistor 60 by the combined saturation currents of both conducting paths of valve 52. Assuming this voltage drop to be 50 volts, the slider 63a will be adjusted to the 250-volt point on the voltage divider 62, 63, and a net voltage of 50 volts will appear across the output terminals 49c and 49d when both valves 52 and 53 are at cutoff. This is the maximum positive output voltage of the cosine regulator and it exists when the force on the tracer finger is zero, as indicated by the point 51a on curve 51 in Fig. 5. As the force increases, the voltage supplied to the input terminals 49a and 49b increases linearly and in accordance with curve 47. This causes the left-hand conducting path of valve 52 to become conducting and to conduct an amount of current that increases as the input voltage increases. This increasing current produces an increasing voltage drop across resistor 60 which is in opposition to the voltage between terminals 54a and slider 63a so that the voltage of terminal 60a begins to decrease with the result that the net voltage across output terminals 49c and 49d decreases correspondingly. This is indicated in Fig. 5 by the negative slope of curve 51 between the points 51a and 51b. The magnitude of the current conducted by the left-hand conducting path of valve 52, and consequently, the steepness of the curve 51 between points 51a and 51b, depends upon the adjustment of anode resistor 56.

When the force on the tracer finger increases to the value b and the input voltage increases to a value corresponding to the height of curve 47 at point 47b in Fig. 5, the current in the left-hand conducting path of valve 52 reaches saturation, and the voltage across output terminals 49c and 49d is decreased to the value indicated by point 51b on curve 51. At this point, the right-hand path of valve 52 becomes conducting.

As the force on the tracer finger increases beyond the value b, the right-hand path of valve 52 conducts an increasing amount of current with the result that the voltage drop across the resistor 60 is further increased until the saturation point is reached, which occurs when the force on the tracer finger has a value corresponding to the dotted line c, Fig. 5. At this point, the voltage drop across resistor 60 is equal to the voltage drop between terminal 54a and the slider 63a with the result that the net voltage across the output terminals 49c and 49d is zero, which condition is represented in Fig. 5 by the curve 51 crossing the zero axis at point 51c. The slope of the curve 51 between points 51b and 51c is made greater than the slope between 51a and 51b by adjusting the resistor 57 to a lower value than resistor 56.

As the force on the tracer finger is increased beyond the value c, the left-hand and right-hand paths of valve 53 are successively rendered conducting, and the voltage drop across resistor 60 is correspondingly increased with the result that the terminal 60a becomes more negative than the slider 63a, thereby reversing the polarity of the voltage across the output terminals. With increasing force on the tracer finger the output voltage takes on the successive values indicated by the negative half of curve 51 until at a force corresponding to dotted line e, both conducting paths of valve 53 are saturated and the voltage drop across resistor 60 is twice the voltage drop between terminal 54a and slider 63a, so that the net voltage across the output terminals 49c and 49d is equal in magnitude and opposite in polarity to the maximum positive voltage. This maximum negative voltage is represented in Fig. 5 by the point 51e, the ordinate of which is equal to but opposite in sign to the ordinate of the point 51a which represents the maximum positive voltage. Thus it is seen that by proper adjustment of resistors 56, 57, 58, and 59, the voltage output of the cosine regulator is caused to approximate a true cosine function of the magnitude of the force applied to the tracer finger. A closer approximation, if desired, can be obtained by increasing the number of valves.

The sine regulator 48 is similar in most respects to the cosine regulator. It comprises two electric valves 64 and 65 which are identical with valves 52 and 53 of the cosine regulator. The grids of both valves are connected together to the input terminal 48a. A voltage divider comprising fixed resistors 66a, 66b, 66c, and 66d and adjustable resistor 66e is connected across the power input terminals 48e and 48f. The cathodes 64a, 64b, 65a, 65b are connected to points on the voltage divider of progressively increasingly positive voltage, so that the left-hand conducting path of valve 64 is biased to cutoff and the right-hand path and both paths of valve 65 are biased beyond cutoff by progressively increasing amounts. The anodes 64c and 64d of valve 64 are connected to output terminal 48c, and the anodes 65c and 65d are connected to output terminal 48d. Two resistors 68 and 69 are connected in series across the output terminals and their junction point 68a is connected to the positive power input terminal 48e.

When both valves are at cutoff the voltage difference across the output terminals is zero. However, as the force on the tracer finger is increased from zero, the voltage from amplifier 45 is applied to the input terminals 48a and 48b, and the left and right-hand paths of valve 64 become successively conducting and produce voltage drops across resistor 68 so that a net voltage appears across the output terminals 48c and 48d. The portion of the curve 50 between zero and 50b represents the output voltage as the force increases from zero to the value b, and the portion of the curve between the points 50b and 50c represents the output voltage as the force increases from b to c. As the force increases beyond the value c both paths of valve 65 become successively conducting and produce a voltage drop across resistor 69 which is in opposite sense to the voltage drop across resistor 68, and therefore, decreases the net voltage at the output terminals. The portion of curve 50 between points 50c and 50d represents the output voltage as the force increases from value c to value d, and the portion between the points 50d and 50e represents the output voltage as the force increases from value d to value e.

Thus the force on the tracer finger increases linearly from zero, the output voltage of the cosine regulator 49 varies continuously from a maximum positive value to a maximum negative value, and the magnitude of the output voltage of the sine regulator 48 is simultaneously varied continuously but inversely to the magnitude of the output voltage of the cosine regulator. However, the polarity of the output voltage of the sine regulator does not change.

The transverse movement of the cutter 15 is effected by means of an electric motor 70, the drive shaft of which is connected to the cross slide 17 of the lathe through suitable driving connections illustrated as comprising worm gearing 71, shaft 72, bevel gearing 73, and a lead screw 74.

Although the motor 70 may be of any suitable type, it is illustrated as a split series field direct current motor. Power is supplied to the motor 70 from a suitable source of single phase alternating voltage which is represented by the two supply lines 75 through a transformer 76 and suitable electric valve apparatus comprising the thyratron valves 77 and 78. These two valves 77 and 78 are connected as half-wave rectifiers and individually supply voltage to the motor through one or the other of the split field windings 70a or 70b to effect rotation of the motor in the forward or reverse direction as required. The anodes 77a and 78a of thyratrons 77 and 78 are connected through the field windings 70a and 70b in parallel and through the armature of motor 70 to the right-hand terminal of the secondary winding of transformer 76, and the cathodes 77b and 78b are connected to the left-hand terminals of the secondary winding. A pair of resistors 79 and 80 is connected in series relationship with each other across the control grids 77c and 78c, and the junction point 79a of these two resistors is connected through the active portion of a potentiometer resistor 81 between the terminal 79a and the slider 81a to the cathodes 77b and 78b. A periodically varying voltage is supplied from a source 82 through a phase shifting bridge network to the potentiometer 81 and thence to the control grids 77c and 78c. The source 82 may be and preferably is the same source as the source 75 to which the anodes are connected. As shown, the phase shifting bridge network comprises the opposite halves of the secondary winding of the transformer 83, the adjustable resistor 84, and the capacitor 85. By suitably adjusting the resistor 84, the alternating component of voltage supplied to the control grids may be dephased with respect to the anode voltage. Preferably the resistor 84 is adjusted so that the alternating voltage supplied to the control grids is dephased from the anode voltage by approximately 90 degrees lagging, with the result that the thyratrons 77 and 78 conduct only during a small portion of the positive half-cycle of the voltage applied to the anodes 77a and 78a.

For the purpose of amplifying the direct voltage output of the cosine regulator, a suitable amplifier comprising a twin triode valve 86 is provided. Power is supplied to the power input terminals 86a and 86b of this amplifier from a suitable independent D. C. source. The control grids of this amplifier are biased to provide push pull class A operation with both paths of the valve conducting equal amounts of current through resistors 87 and 88. When a voltage is supplied from the cosine regulator to the grids of valve 86, one path is caused to conduct more current than the other, depending upon the polarity of the voltage from the cosine regulator with the result that the voltage drop across one of the resistors 87 and 88 is increased and the voltage drop across the other is decreased. As a result, a direct current voltage component in the positive direction is applied to the grid of one of the thyratrons. This direct current component adds to the alternating current component supplied to the grid in such a direction as to have the effect of advancing the phase of the grid voltage thereby to render the thyratron conducting by an amount proportional to the magnitude of the voltage supplied from the cosine regulator to the amplifier valve 86. At the same time, a direct current component is supplied to the control grid of the other thyratron in such a direction that it further retards the phase of the grid voltage, and thus the thyratrons 77 and 78 are selectively energized to effect rotation of motor 70 in one direction or the other depending upon the polarity of the output voltage of the cosine regulator. In the circuit shown when the output terminal 49c of the cosine regulator is positive, the thyratron 77 is energized and that current is supplied to the motor 70 in such a direction for example as to cause the tool 15 to be moved inward toward the work piece 10.

Conversely, when the output terminal 49d of the cosine regulator is positive, the thyratron 78 will be energized and the motor 70 will be caused to rotate in a direction to withdraw the tool 15 from the work. The rotational response may be reversed by means of a switch in lines 49c, 49d as required.

The amplification ratio of amplifier 86 is such that a very small voltage, e. g., one volt across the output terminals of the cosine regulator will fully advance the phase of the grid voltage of one or the other of the thyratrons 77 and 78. As a result, the active thyratron tends to supply a current to the armature of the motor 70 which is several times full load value. This would tend of course to accelerate the motor 70 to maximum speed for any output voltage of the cosine regulator in excess of one volt.

For the purpose of accurately regulating the speed of motor 70 to a value corresponding to the instantaneous magnitude of the output voltage of the cosine regulator, means are provided for supplying to the grid circuit of the amplifier valve 86 a signal voltage which is proportional to the speed of the motor 70 and opposite in polarity to the voltage supplied from the cosine regulator. This signal voltage is provided by means of a tachometer generator 89 which is driven by motor 70 and generates a voltage which is linearly proportional to the speed of motor 70. This signal voltage is applied across a resistor 90 in the grid circuit of amplifier valve 86 so that it opposes the voltage supplied from the cosine regulator, and the difference of the two voltages is the effective control voltage on the grid of the amplifier valve. The tendency of this feedback circuit is to regulate the signal voltage to the output voltage of the cosine regulator. In other words, it maintains the signal voltage approximately equal to the output voltage of the cosine regulator. Since the signal voltage is linearly proportional to the speed of motor 70, an equilibrium condition is reached when the difference of the two voltages is just sufficient to cause the motor 70 to operate at a speed which accurately corresponds to the magnitude of the output voltage of the cosine regulator. Since the output voltage of the cosine regulator is a cosine function of the magnitude of the force applied to the tracer finger, the speed of the motor 70 will also be a cosine function of the magnitude of this force.

The longitudinal feed lead screw is driven by a motor 91 which is controlled to operate at a speed which is proportional to the magnitude of the output voltage of the sine regulator 48 by means of electric valve apparatus shown within the dotted rectangle 92. This apparatus is identical with the electric valve apparatus which controls the cross feed motor 70, and accordingly, a repetition of the description and operation of this electric valve apparatus is omitted. The tachometer generator 93 performs the same function in regulating the speed of the longitudinal feed motor 91 that is performed by tachometer generator 89 in regulating the speed of the cross feed drive motor 70.

A voltmeter 94 is connected across the output terminals of the amplifier 45. The scale of this meter is so calibrated that each graduation corresponds to .00005 inch deflection of the tracer finger. The meter can thus be used as a very accurate gauge for electrical adjustment of the cross feed of the compound rest for taking finish cuts. Since it is possible to estimate fairly accurately one-half the distance between scale graduations, the cross feed can be adjusted to within .000025 inch of a desired position. This degree of accuracy exceeds by a wide margin that obtainable by means of the usual mechanical scales on the cross feed adjustment of a lathe. The electrical adjustment consists in shifting the bridge balance the desired degree by means of the potentiometer 41. Also, the voltmeter 94 serves as an extremely accurate measuring device in setting up a templet on the templet supporting plates. Any lack of parallelism between the longitudinal edge of the templet and the center axis of the lathe and the amount of such divergence is readily indicated on the meter by moving the tracer finger along the longitudinal edges of the template with no work piece in the lathe.

With the foregoing understanding of the elements and their organization in the system, the operation of the system will readily be understood from the following detailed description.

It may be assumed that the tool and tracer are in position for starting a cut. In other words, the tracer point 25b will be withdrawn from the longitudinal edge 13a at the left of the pattern, as indicated in Fig. 6 which is an enlarged schematic view of the portion of the pattern constituting the longitudinal edge 13a and the semicircular edge 13b. The tracer point 25b is in the position indicated in Fig. 6, and the tool 15 is in a corresponding position with respect to the work piece 10.

The system is energized by closing the switches 95, 96, and 97. Although the switches are illustrated as simple manually operated knife switches, it will be understood of course that they may be remotely controlled electromagnetic contactors. When the tracer point 25b is in the position illustrated in Fig. 6, no force is exerted on the tracer finger. Since, when no force is exerted on the tracer finger, the output voltage of the cosine regulator is maximum and the output of the sine regulator is zero, as indicated in Fig. 5, the cross feed motor 70 which is controlled by the cosine regulator will advance the tool toward the work piece and at the same time advance the tracer finger toward the templet at maximum speed, as indicated by the dotted arrow associated with the tracer point 25b in Fig. 6. The output voltage of the sine regulator being zero, the longitudinal feed motor 91 will be at rest and there will be no component of longitudinal movement of the tool. This relationship of the speeds of the cross feed motor 70 and the longitudinal feed motor 91 is indicated in Fig. 7.

When the tracer point 25b engages the edge 13a of the pattern, a force is exerted on the tracer finger and this force quickly builds up to the value indicated by the dashed line c' in Fig. 8, and the magnitude of this force is also indicated by the vector 96a in Fig. 6. As indicated in Fig. 8, when a force of this magnitude is applied to the tracer finger, the output of the cosine regulator decreases to zero and the output of the sine regulator increases to a maximum, with the result that the speed of the cross feed motor is decreased to zero and the speed of the longitudinal feed motor 91 is increased to maximum. This results in moving the tracer finger in a longitudinal direction with zero component of transverse motion as indicated by the dotted arrow 97a. Simultaneously of course the cutter 15 is moved along the work piece in the same direction.

As the tracer point 25b begins to move out of engagement with the edge 13a of the pattern at the corner 13b, the force on the tracer finger decreases at a rapid rate with the result that the speed of the cross feed motor 70 is rapidly increased to maximum and the speed of the longitudinal feed motor 91 is rapidly decreased to zero. This causes the tracer point to advance inwardly along the semicircular edge 13b of the pattern as illustrated by the dotted line 98 which indicates the path of movement of the center of the tracer point. The cutter is of course maintained in a corresponding position with respect to the work piece.

As the tracer finger 25b is moved inwardly along the semicircular curve 13b, the force on the tracer finger again increases linearly, thereby decreasing the speed of the cross feed motor 70 and increasing the speed of the longitudinal feed motor 91. When the tracer point has moved through 45 degrees of arc along the semicircular edge 13b, the force exerted on the tracer finger attains the magnitude indicated by the dashed line b' in Fig. 9, with the result that the cross feed motor 70 and longitudinal feed motor 91 operate at equal speeds as indicated in Fig. 9 by the intersection of the sine curve and cosine curve on the dashed vertical line b'. Since the speeds of both motors are equal, the tracer point and the cutter 15 will have a direction relative to the pattern and work piece, respectively, which is at an angle of 45 degrees to the horizontal edge 13a as indicated by the arrow 97b in Fig. 6.

When the tracer finger reaches a position halfway along the semicircular curve 13b, the force on the tracer finger represented by the vector 96c again increases to the value represented by the dashed line c' in Fig. 8 which is the same value of force that was exerted on the tracer finger when it first came into contact with the longitudinal edge 13a. As a result, at this point the tracer finger and the cutter are moved in a longitudinal direction with no component of transverse motion as indicated by the dotted arrow 97c in Fig. 6.

As the tracer finger 25b moves beyond the midposition on the semicircular curve in Fig. 6, the force on the tracer finger is increased beyond the value indicated by the vertical line c' because the longitudinal feed motor 91 tends to keep forcing the tracer finger against the semicircular edge 13b and the speed of the cross feed motor is zero. But, as the force increases beyond the value indicated by the dashed line c', the output voltage of the cosine regulator passes through zero and the polarity of the voltage reverses, with the result that the cross feed motor 70 rotates in the reverse direction to withdraw the tracer finger and the cutter.

This reverse component of the cross feed motion produced by the reverse rotation of the cross feed motor combined with the longitudinal component produced by the longitudinal feed motor causes the tracer and the cutter to follow a path along the semicircular edge 13b between the positions indicated by the vectors 96c and 96d in Fig. 6.

At the 45-degree position represented by the position of the vector 96d, the force on the tracer finger attains a value indicated by the magnitude of the vector 96d which corresponds to the magnitude of the force indicated by the dashed line d' in Fig. 10, with the result that the cross feed motor 70 and the longitudinal feed motor 91 operate at speeds represented by the intersection of the dashed line d' with the sine and cosine curves. In other words, the speeds of both motors will be equal and the cross feed motor 70 will be rotating in the reverse direction, i. e., the direction to withdraw the tracer finger and the tool. The results of these two components will produce a resultant relative movement of the tracer point and pattern indicated by the dotted arrow 97d and will of course also produce a corresponding relative movement between the cutter and the work piece.

As the tracer point approaches the corner 13d, the component of movement produced by the cross feed motor can no longer relieve the force on the tracer finger, and consequently, this force continues to increase until when it attains a magnitude represented by the vector 96e and by the position of the dashed line e' in Fig. 11, the speed of the longitudinal feed motor 91 is decreased to zero and the speed of the cross feed motor 70 is increased to a maximum in the reverse direction as indicated by the intersection of the dashed line $e'$ with the sine and cosine curves. As a result, the tracer point and the tool will be withdrawn at maximum speed.

However, as the tracer point tends to ride off the edge of the templet at the corner 13d, the force on the tracer finger decreases rapidly to the value indicated by the position of the dashed line $c'$ in Fig. 8, with the result that the tracer finger and cutter are moved in a longitudinal direction with no component of transverse motion as indicated by the intersections of the dashed line $c'$ with the sine and cosine curves 50' and 51' in Fig. 8. Thus, the relative movement of the cutter and work piece is controlled to follow a path corresponding to the contour of the pattern.

Thus, the relative movement of the cutter and work piece is controlled to follow a path corresponding to the contour of the pattern.

The constancy of the magnitude of the velocity V of the relative movement of the cutter and work piece for all cutting angles on the contour is illustrated in Fig. 12 and is explained mathematically as follows: The relationship between the sine and cosine functions of a variable quantity such as an angle is defined for all values of the angle by the equation:

(1) $\sin^2 + \cos^2 = 1$, or (2) $\sqrt{\sin^2 + \cos^2} = 1$, which is a constant.

Since the velocity of the longitudinal components $V_L$ is always proportional to the sine function of the magnitude of the force F on the tracer finger and the velocity of the transverse component $V_T$ is always proportional to the cosine function of the magnitude of the force F, therefore, (3) $\sqrt{V_L^2 + V_C^2} =$ a constant, and since the resultant velocity $V = \sqrt{V_L^2 + V_C^2}$, therefore V equals a constant.

In other words, the velocity V of the relative movement of the cutter and work piece is constant for all angles of such movement along the path of the contour of the work piece.

In Fig. 13 which illustrates an application of the invention to a polar co-ordinate type milling machine, the work piece 100, which is illustrated as a cam, is mounted on a rotating table 101 and the pattern 102 is secured to a frustum shaped spindle 103.

The milling cutter 104 together with its driving motor 105 are mounted on a head 106 which, in turn, is slidably mounted in ways 107a built in the crossrail 107. In many types of milling machines, the cross rail is slidably mounted on uprights to provide for elevation, but in the simple milling machine illustrated, the crossrail is fixedly secured to an upright 108 which preferably is formed integral with the bedplate 109. The tracer finger 110 is fixedly mounted on the crossrail 107, and a manually rotatable lead screw 111 serves to position the head 106 along the ways to provide for initial adjustment of the distance between the milling cutter and the tracer finger.

The table 101 and spindle 103 are rotatably mounted on a platen 112 which is slidably mounted on the slide 109a with which the bedplate 109 is provided.

Movement of the platen 112 together with the rotating table 101 which supports the work piece and the spindle 103 which supports the pattern is effected by means of a lead screw (not shown) which is driven by means of an electric motor 113 through suitable worm gearing 114. This component of the relative movement of the cutter and work piece represented by the vector $V'_C$ in Fig. 14 corresponds to the transverse component of the relative movement produced by the cross feed motor 70 in the system of Fig. 1.

The table 101 and the pattern supporting spindle 103 are driven in synchronism with each other by means of an electric motor 115 to the drive shaft of which the table and the spindle are respectively connected through suitable worm gearing 116 and worm gearing 117 which have the same ratio. The component of relative movement between the cutter and the work piece produced by the motor 115 and represented by the vector $V'_L$ corresponds to the longitudinal component of movement produced by the longitudinal feed motor 91 in Fig. 1.

The cross feed motor 113 and the longitudinal or rotary feed motor 115 are controlled by means of electric valve apparatus (not shown) which is identical with the electric valve apparatus of Fig. 1. In other words, the motors 113 and 115 replace the motors 70 and 91, respectively, in the control system of Fig. 1.

The operation of the apparatus of Fig. 13 when translated into terms describing milling machine operation instead of lathe operation is in all material respects identical with the operation of the system of Fig. 1, and a repetition of such operation is omitted.

Although in accordance with the provisions of the patent statutes this invention is described as embodied in concrete form and the principle thereof has been described, together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What we claim as new and desire to secure by Letters Patent of the United States is:

1. A control system comprising in combination, a movable element having an initial position, a pair of members, a separate driving means for each of said members and means responsive to a continuously increasing displacement of said element from said initial position for producing a linearly varying voltage, means for deriving from said voltage two inversely varying control voltages, means responsive to one of said inversely varying voltages for energizing one of said driving means to effect a component of relative movement of said members with a velocity that varies continuously from a maximum value in one direction to a maximum value in the reverse direction and means responsive to the other of said inversely varying voltages for energizing the other of said driving means to effect an angularly displaced component of relative movement of said members with a velocity that varies continuously from a minimum value to a maximum value and from said maximum value to a minimum value.

2. A control system comprising in combination, a movable element having an initial position, a pair of members, means responsive to a continuously increasing displacement of said element from said initial position for producing a voltage that varies substantially linearly with said displacement, electric valve means for deriving from said voltage a first control voltage that varies from a positive maximum to a negative maximum and a second control voltage that simultaneously varies from a minimum value to a maximum value and from said last mentioned maximum value to a minimum value, and driving means responsive to said first and second control voltages for effecting relative movement of said members with a velocity having a component that varies from a maximum value in one direction to a maximum value in the reverse direction and an angularly displaced inversely varying component.

3. A control system comprising in combination, a movable control element having an initial position, a pair of driving means and means responsive to a continuous displacement of said control element from said initial position for producing a voltage which varies approximately linearly with said force, means responsive to said voltage for producing a first control voltage which varies from a positive maximum to a negative maximum, and a second control voltage that varies simultaneously from a minimum value to a maximum value and from said last mentioned maximum value to a minimum value, means responsive to said first control voltage for energizing one of said driving means to operate at a speed that varies continuously from a maximum value in one direction to a maximum value in the reverse direction and means responsive to said second voltage for energizing the other of said driving means to operate in one direction at a speed that varies inversely with the speed of said first driving means.

4. A control system comprising in combination, a magnetostrictive control element, a pair of driving means, means for applying a force to said element, and means responsive to the resulting change in permeability of said element for producing a voltage that varies approximately linearly with said force, and electric valve means for deriving from said voltage a first control voltage that varies continuously from a positive maximum value to a negative maximum value and a second control voltage that simultaneously varies from a minimum value to a maximum value and from said last mentioned maximum value to a minimum value, and means responsive to said control voltages for effecting operation of one of said driving means at a speed that varies continuously from a maximum value in one direction to a maximum value in the reverse direction and simultaneous operation of the other of said driving means in one direction at a speed that varies inversely with respect to the speed of said first driving means as said force is continuously varied.

5. A control system comprising in combination, a magnetostrictive control element, a pair of driving means, means for applying a variable force to said element, means responsive to the resulting change in permeability of said element for producing a continuously variable voltage, means for deriving from said variable voltage two inversely varying control voltages and means responsive to said inversely varying voltages for effecting operation of said driving means at inversely varying speeds.

6. A control system comprising in combination, a magnetostrictive control element, a pair of electric motors, means for applying a variable force to said element, means responsive to the resulting change in permeability of said element for producing a continuously variable control voltage, means for deriving from said voltage two continuously and inversely varying control voltages, and means controlled by said inversely varying voltages for operation of said motors at speeds that vary inversely with respect to each other as said force is continuously varied.

7. A control system comprising in combination, a magnetostrictive control element, a pair of electric motors, means for applying a variable force to said element, means responsive to the resulting change in permeability of said element for producing a direct control voltage that varies substantially linearly as said force varies, means for deriving from said voltage a first control voltage that varies continuously from a maximum value of one polarity to a maximum value of the opposite polarity and a second control voltage of fixed polarity that varies inversely in magnitude with respect to said first control voltage, and means controlled by said derived first control voltage for effecting operation of one of said motors at a speed that varies continuously from a maximum value in one direction to a maximum value in the other direction.

8. A control system comprising in combination, a magnetostrictive control element, a pair of electric motors, means for applying a force to said magnetostrictive element, means responsive to the resulting change in permeability of said element for producing a voltage that varies continuously as said force varies, electric valve means for deriving from said voltage a first control voltage that varies continuously from a maximum value of one polarity to a maximum value of the opposite polarity and a second control voltage of unchanging polarity that varies inversely in magnitude with respect to said first derived control voltage as said force varies continuously, and means individually responsive to each of said derived control voltages for effecting operation of each of said motors corresponding in speed and direction to the magnitude and polarity respectively of a different one of said derived control voltages.

HANS P. KUEHNI.
NORMAN G. BRANSON.